Dec. 13, 1960 E. F. DYSON 2,964,057
PILOT VALVE
Filed Oct. 19, 1959

United States Patent Office 2,964,057
Patented Dec. 13, 1960

2,964,057

PILOT VALVE

Ernest F. Dyson, Cheshire, Conn., assignor to The Bristol Company, Waterbury, Conn., a corporation of Connecticut Filed Oct. 19, 1959, Ser. No. 847,245

13 Claims. (Cl. 137—620)

This invention relates to pilot valves for fluid-actuated control apparatus, and more especially to those types of valves suitable for use in pneumatic control devices.

In such valves a seating member subject to actuation by variations in fluid pressure on a piston cooperates with a seat to provide a variable closure in a conduit admitting compressed air or equivalent pressure fluid to a fluid-motor-operated control apparatus. The fluid pressure is regulated by means of supply-and-waste means wherein the admission of air is limited by passage through a fixed restriction in the supply and the escape is controlled by means of a baffle, or "flapper," more or less juxtaposed to a small escape orifice communicating with the atmosphere.

It is commonly characteristic of such pilot valves that during the time the baffle is in a position at which it does not obstruct the escape of air from the orifice, the flow of air, restricted only by a fixed restriction in the supply, or by some equivalent construction, goes on continuously and, though the discharge rate is relatively low, the fact that this flow continues for extended periods of time means that the total volume of air wasted to the atmosphere is not negligible and becomes a factor of importance where large numbers of such pilot valves are used in multiple control operations. In a patent assigned to the same assignee as the present application, namely U.S. Patent 2,831,465, granted to G. H. Perry, a construction is set forth by which this continuous flow, or "bleed," may be substantially eliminated.

The capacity for air transfer of prior art devices of this class is small and, because of this drawback, in order to accomplish fast relay action of pneumatic process operators, intermediate relay valves are commonly required between the primary pilot valve and the process valve, or operator.

It is, therefore, an object of my invention to provide a device of the above class in which provision is made for passage of the pressure fluid at high rates of flow.

It is a further object of this invention to provide a device of the class described in which the flow of pressure fluid to the output or to the exhaust to atmosphere may be made substantially equal.

It is a further object of hte invention to provide a device of this class having a "snap-action" by which the full control action follows rapidly with a minimum initiating force and a minimum movement of the "flapper."

It is a still further object of this invention to provide a device of this class described in which component parts involve no special requirements regarding fits and clearances, and the unit is especially amenable to easy assembly.

In carrying out the purposes of the invention there is preferably provided an auxiliary valve element normally held closed by air pressure and adapted for mechanical actuation by the baffle or tappet which commands the action of the pilot valve. By this means, the escape of air to the atmosphere through the controlling orifice is limited to those brief operating intervals when the baffle is between its extreme positions corresponding to the open and the closed positions of the valve. The auxiliary valve element, immediately on initiation of control motion, opens a second and more effective access path for the pressure fluid to the main operating diaphragm, thereby taking over the supply of moving force to the output. Furthermore, the action is speeded and the capacity increased by requiring only one restriction to fluid flow and by providing interdependent but separate piston elements which alternately interconnect the outlet and the exhaust and the inlet and outlet, through loosely fitting, telescoping, cylindrical elements.

Other objects and advantages of my invention will appear from the description which follows and the accompanying drawings in which Figure 1 is a cross-sectional view of a valve embodying the principle of my invention; the valve mechanism being shown in the un-operated state;

Figure 1:
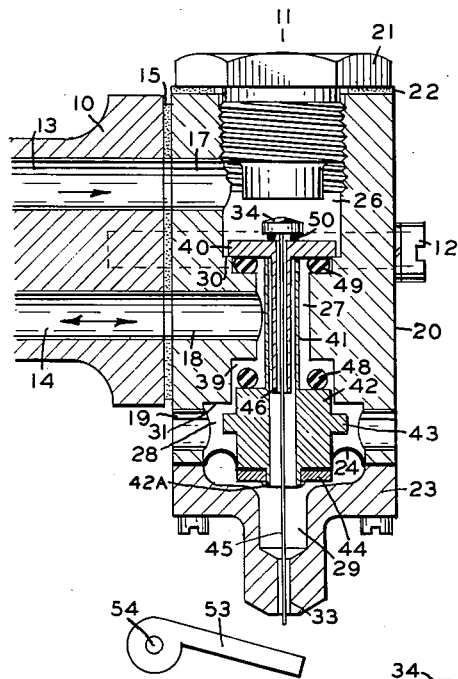

Referring now to the drawings, the valve unit 11 may be fastened to a fixed base member 10 by screws 12. This base member provides access holes, or ports, for connection to external piping, one of which, designated 13, connects to a source of fluid pressure and the other, marked 14, connects through a conduit (not shown) to an operator (not shown) such as a process valve, which is under the control of the pilot valve to be described. A gasket 15 of a resilient material between base and valve seals the system from leakage of air which may be assumed as a typical pressure fluid for this class of device.

The valve proper to which the present application is specifically applicable comprises the following components: a shell, or body member, 20, an orifice cap member 23, and a screw cap member 21. The body member is formed of a metal block, somewhat elongated, in which a hole is drilled longitudinally and counterbored from either end whereby to define three cavities within the structure, namely, a middle cavity, or chamber 27, which is of smallest diameter, and on either side thereof, two outer cavities, or chambers 26 and 28, of diameters greater than that of the inner cavity. The counterboring in each end of the body member may provide intermediate "steps" 30, 31, between the diameter of the inner cavity and the diameters of the two outer cavities for purposes to be discussed hereinafter.

One end of the body member 20 is internally threaded to accommodate the solid screw cap 21 which with the aid of a gasket 22, seals the outer cavity 26. The other end is faced and drilled to cooperate with the flanged cap member 23 which is machined internally to form a further cavity 29 and is drilled to form an orifice 33. On assembly, a flexible diaphragm 24 of a rubber or a rubber-like material is interposed between the body member 20 and the cap member 23 which, in cooperation with the inner valve assembly in a manner yet to be described, separates the cavity 28 of the body member from the cavity 29 of the cap 23.

The body member 20 is also drilled transversely to form ports 17, 18 and 19. The two former are adapted to mate with passages 13 and 14 of the base member 10 and, thus, provide, respectively, access for the supply of pressure fluid to chamber 26 and access of the output to and from chamber 27. The port 19 provides access from chamber 28 to the atmosphere.

The inner valve assembly consists of a piston element 42 more or less conformed to a cylindrical recess 39 formed as an extension of chamber 28 by the step 31. A ridge portion 43 is formed in the piston of a diameter greater than that of the recess 39. On engagement with the "step" or shoulder 31 this acts to limit the motions of the piston in one direction. The body of the piston is extended through central cavity 27 by an extension on one side thereof in the form of a tube 41. At the other side of piston 42 is a small tubular extension 42a of reduced outer diameter which receives the diaphragm member 24 and then a retaining washer 44. The end of the extension 42a may be rolled over or soldered to the washer to seal the diaphragm to the piston. The recess 39 accommodates an O-ring 48 of conventional design and of a soft, resilient rubber, or rubber-like material. The size of the O-ring is chosen in combination with dimensions of the cavity so that when it is compressed between the piston 42 and the end wall of the recess 39, it blocks the passage of the pressure fluid. The limitation of motion provided by engagement of ridge 43 and shoulder 31 prevents excessive deformation or damage to the O-rings at high pressure values.

A second piston element 40 is located in the outer cavity 26 and has a diameter somewhat less than that of the cavity but greater than the "step" 30. The step or shoulder 30 thereby limits the axial motion of the piston in one direction. The piston 40 is joined with an extended tubular portion 46 which fits within the tubular portion 41 of the piston element 42 in telescoping relation therewith. Throttling action is provided by an O-ring 49, similar in form and material to O-ring 48, already described, when compressed between one face of piston 40 and the end-wall of the cavity 26. Limitation of compression is provided in a manner similar to the previous case, by the shoulder 30 in the cavity 26 in engagement with the body of the piston.

Figure 3:
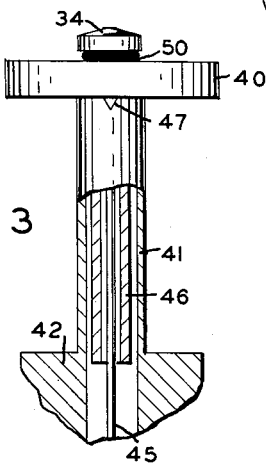
Figure 3 is a detailed view, partly broken away, of the embodiment of Figures 1 and 2, showing the cooperation of parts of the inner valve.

Details of the interrelation of engaging parts of the two pistons are shown in Figure 3. The telescoping tubular portions 41 and 46 are shown fully collapsed, wherein the end of tube 41 abuts against the piston 40. A small notch 47 may be cut in the end of tube 41 to provide positively for a minimum passage for pressure fluid when the tube rests against the surface of piston 40, although in practice normal leakage between the end of tube 41 and the surface of piston 40 may provide an adequate flow. The purpose of this will become clear in later discussion.

The final element of the inner valve mechanism is the stem member 45, a long, thin rod portion extending axially through the inner valve structure, one end thereof projecting into and, for one state of the valve, through the orifice portion 33 of the valve cap 23. The inner end of the stem member is fixed to a small, flattened seating member 34 which provides means in cooperation with an O-ring 50 for throttling the passage of pressure fluid from the space 26 through the axial hole in piston 40 into chamber 29. The O-ring 50 is of similar material as O-rings 48 and 49 and of dimensions suitable to provide a positive seat for the seating member 34.

Figure 2:
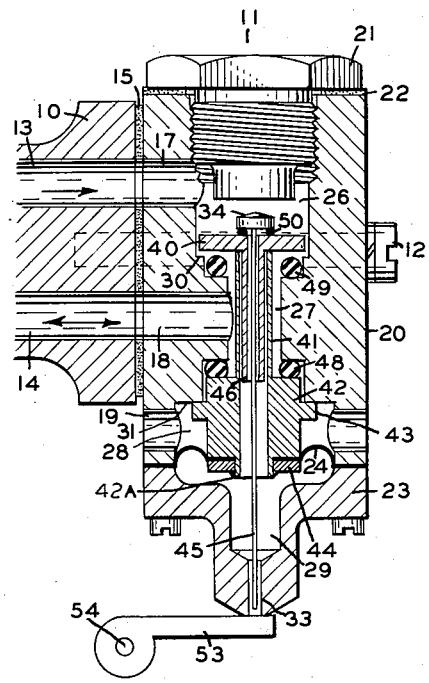
Figure 2 is the same view as Figure 1 except that the valve mechanism is in the fully operated state.

Independent of the pilot valve is an operator member which may in practice take a variety of forms but is shown typically in Figures 1 and 2 as a flapper, or obturator, member 53 pivoted about on axis 54. As illustrated in Figures 1 and 2, in moving to its engaged position the flapper has encountered the stem member 45, causing it to be withdrawn within the orifice 33 in a manner to be described and has covered the orifice to seal substantially this access between cavity 29 and the atmosphere. It serves as the control-initiating agency and is assumed to be moved by control apparatus not shown.

The operation of the pilot valve mechanism may now be described as follows:

First, it may be assumed that air, or other appropriate fluid, is supplied under pressure through conduit 13 and passage 17 into valve chamber 26. In the normal, unoperated state as pictured in Figure 1, the supply pressure bears on piston 40 and stem seat member 34 causing them to bear against the O-rings 49 and 50 respectively thereby sealing any access from chamber 26 with space 27 and the interior of tube 46. In this condition, the chamber 29 is at atmospheric pressure having come to equilibrium through orifice 33. Thus, the lower piston 42 is retracted and the output fluid, transmitted through conduit 14 and passage 18, has been exhausted to the atmosphere by the open valve seat between chambers 27 and 28.

Now as the baffle 53 moves to effect a control operation, it first encounters the protruding stem 45 and, after a slight motion thereof effectively raises the head 34 from the seating ring 50. Air immediately pours through the central passages of the inner valve formed by tube 46 into the cap chamber 29, building up a pressure therein which is only partly bled off through the orifice passage 33 by reason of its relatively small diameter. The piston 42 is thereby advanced, causing the O-ring 48 to become engaged between the piston and its seat on the valve body by which the output chamber 27 becomes completely isolated from the atmospheric chamber 28. Meanwhile the telescoping tube sections have become fully contracted and the tube extension 41 of piston 42 engages the face of piston 40 raising it from its seating ring 49 and allowing access of the supply pressure to the output chamber 27 and thence, to the output conduit 14 and dependent control apparatus.

The action of the valve thus far described takes place very rapidly following the initial displacement of the stem. As a result, the action of the stem movement is merely to trigger the action of the main valve. It may be observed also that the force required to initiate valve action is minimized by providing that the combined effective area of piston 42 and diaphragm 24 presented to the pressure in the orifice chamber 29 shall be substantially greater than that presented by piston 40 to the supply pressure. Thus, after the initial movement of the auxiliary valve stem 45 a very moderate build-up of pressure in chamber 29 causes operation of the main valve. It is to be noted that piston 40 is free to move upward independently of piston 42 and may "float" to an optimum position to permit maximum flow of fluid from chamber 26 into passage 27.

Following the valve action further, the movement of piston 40 re-closes the stem seat 34, thereby withdrawing the outer end of stem 45 out of contact with baffle 53 and into the orifice passage 33. Meanwhile the baffle 53 may be assumed to have covered the orifice hole 33 and to allow the pressure in chamber 29 to be maintained. While it may, in practice, be expected that some leakage of air will occur at the orifice, even though obstructed by baffle 53, positive provision is made by the small notch 47 in tube 41 so that a bleed of air which is small compared to the flow through the unobstructed orifice 33, is made available from the supply side to chamber 29 to compensate at all times for leakage losses in chamber 29 when under pressure.

When baffle 53 operates to uncover the orifice 33, the pressure in chamber 29 falls, permitting retraction of piston 42 and, correspondingly the upper piston 40 is advanced. The latter action cuts off the supply pressure while the former opens the output chamber 27, when the air in the dependent control apparatus exhausts to the atmosphere. As was brought out in connection with piston 40, piston 42 is free to move downward independently of piston 40 and may so move under the influence of the fluid flowing to exhaust to permit a maximum flow rate.

It will be observed that the components of the inner valve and their cooperation with the valve body involves only loose fits compatible with generous manufacturing tolerances. The two separate piston elements permit equality of dimensions, and, thus uniquely, the equality of fluid supply and exhaust flow capacity. This latter is of great practical advantage in feeding large capacity control elements which, commonly, require auxiliary "booster" valves operated from the primary pilot valve in order to handle effectively the large flow rates of the controlling fluid.

The extreme simplicity of a valve constructed in accordance with my invention may be more readily appreciated from a consideration of the assembly of such a unit. Beginning with a disassembled body member 20 and holding it with the orifice cap side up, the O-ring 48 is first dropped into the seat recess 39 and the piston 42, to which the diaphragm 24 has been attached as hereinbefore described, is placed thereon. This diaphragm is held by the cap member 23 for which it also serves as a gasket. When the cap is bolted on tightly, the body may be turned around, so that the screw cap side is up. Now, the O-ring 50 is dropped onto its seat, the piston tube dropped into the corresponding tube 41 of the piston 42 and the stem with its O-ring seat falls into the axial hole and through the orifice passage 33. The top screw cap 21 and gasket 22 are installed and tightened, and the valve is ready for use.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, primary valve means forming with said body a variable volume chamber communicating with said orifice and including first and second valve members extending in said first and second chambers respectively, said first and second valve members each being responsive to the pressure differential thereacross and being movable relative to each other between open and closed positions, said first valve member in its closed position closing one end of said passage to prevent communication between said first chamber and said outlet and having a portion thereof engaging said second valve member to unseat the same, said second valve member in its closed position closing the other end of said passage to prevent communication between said outlet and said second chamber and having a portion thereof engaging said first valve member to unseat the same, said primary valve means having a second passage extending therethrough coaxial with said orifice and communicating with said variable volume chamber for providing communication between said first chamber and said variable volume chamber, an elongated stem member extending through said second passage and axially displaceable between two extreme positions, an auxiliary valve member on said stem member responsive to differential pressure thereacross for interrupting the flow of said fluid through said second passage when said stem member is in one position, said stem member in said one of its positions having a portion thereof extending through said orifice adapted to be engaged by said independent control means for displacing said stem member from its said one position, and said orifice being adapted to be obstructed by said independent control means when said stem member is shifted toward its said other position.

2. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, primary valve means forming with said body a variable volume chamber communicating with said orifice and including first and second valve members extending in said first and second chambers respectively, said first and second valve members each being responsive to the pressure differential thereacross and being movable relative to each other between open and closed positions, said first valve member in its closed position closing one end of said passage to prevent communication between said first chamber and said outlet and having a portion thereof engaging said second valve member to unseat the same, said second valve member in its closed position closing the other end of said passage to prevent communication between said outlet and said second chamber and having a portion thereof engaging said first valve member to unseat the same, said primary valve means having a second passage extending therethrough coaxial with said orifice and communicating with said variable volume chamber for providing communication between said first chamber and said variable volume chamber, an elongated stem member extending through said second passage and axially displaceable between two extreme positions, an auxiliary valve member on said stem member responsive to differential pressure thereacross for interrupting the flow of said fluid through said second passage when said stem member is in one position, said stem member in said one of its positions having a portion thereof extending through said orifice adapted to be engaged by said independent control means for displacing said stem member and thereby unseat said auxiliary valve member, said orifice being adapted to be obstructed by said independent control means when said stem member is shifted towards its said other position, and means for providing restricted communication between said inlet and said variable volume chamber when said auxiliary valve member is in its closed position.

3. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, said body including first and second seating surfaces located respectively adjacent to the first and second chamber ends of said passage, first and second primary valve members extending in said first and second chambers respectively and having coaxial tubular stems extending in telescoping relation in said passage coaxial with said orifice, at least one of said tubular stems being longer than the distance between said first and second seating surfaces, said first valve member in response to pressure thereacross being adapted to engage said first seating surface in sealing relationship to prevent communication between said first chamber and said passage and simultaneously to unseat said second primary valve member, pressure responsive means connected to said second primary valve member forming with said body a variable volume chamber communicating with said orifice, said second valve member in response to pressure thereacross being adapted to engage said second seating surface in sealing relationship to prevent communication between said passage and said second chamber and simultaneously to unseat said first valve member, an auxiliary stem member extending through said first and second primary valve members and stems and axially displaceable between two extreme positions, an auxiliary valve member on said stem member adapted in response to pressure thereacross when said member is in one position to engage said first valve member in sealing relationship to prevent communication between said first chamber and said orifice, said auxiliary stem member in said one of its positions having a portion thereof extending through said orifice adapted to be engaged by said independent control means for displacing said stem member and thereby unseat said auxiliary valve member, and said orifice being adapted to be obstructed by said independent control means when said stem member is shifted toward its said other position.

4. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, said body including first and second seating surfaces located respectively adjacent to the first and second chamber ends of said passage, first and second primary valve members extending in said first and second chambers respectively and having coaxial tubular stems extending in telescoping relation in said passage coaxial with said orifice, at least one of said tubular stems being longer than the distance between said first and second seating surfaces, said first valve member in response to pressure thereacross being adapted to engage said first seating surface in sealing relationship to prevent communication between said first chamber and said passage and simultaneously to unseat said second primary valve member, pressure responsive means connected to said second primary valve member forming with said body a variable volume chamber communicating with said orifice, said second valve member in response to pressure thereacross being adapted to engage said second seating surface in sealing relationship to prevent communication between said passage and said second chamber and simultaneously to unseat said first valve member, an auxiliary stem member extending through said first and second primary valve members and stems and axially displaceable between two extreme positions, an auxiliary valve member on said stem member adapted in response to pressure thereacross when said member is in one position to engage said first valve member in sealing relationship to prevent communication between said first chamber and said orifice, said auxiliary stem member in said one of its positions having a portion thereof extending through said orifice adapted to be engaged by said independent control means for displacing said stem member and thereby unseat said auxiliary valve member, said orifice being adapted to be obstructed by said independent control means when said stem member is shifted toward its said other position, and means controlled by said first primary valve member for providing a restricted flow of fluid from said first chamber to said variable volume chamber when said orifice is obstructed and said first primary valve member is unseated.

5. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, said body including first and second seating surfaces located respectively adjacent to the first and second chamber ends of said passage, first and second primary valve members extending in said first and second chambers respectively and having coaxial tubular stems extending in said passage coaxial with said orifice, said second primary valve stem extending in telescoping relation about said first primary valve stem and being longer than the distance between said seating surfaces, said first valve member in response to pressure thereacross being adapted to engage said first seating surface in sealing relationship to prevent communication between said first chamber and said passage and simultaneously to unseat said second primary valve member, pressure responsive means connected to said second primary valve member forming with said body a variable volume chamber communicating with said orifice, said second valve member in response to pressure thereacross being adapted to engage said second seating surface in sealing relationship to prevent communication between said passage and said second chamber and simultaneously to unseat said first valve member, an auxiliary stem member extending through said first and second primary valve members and stems and axially displaceable between two extreme positions, an auxiliary valve member on said stem member adapted in response to pressure thereacross when said member is in one position to engage said first valve member in sealing relationship to prevent communication between said first chamber and said orifice, said auxiliary stem member in said one of its positions having a portion thereof extending through said orifice adapted to be engaged by said independent control means for displacing said stem member toward the other of its positions, and said orifice being adapted to be obstructed by said independent control means when said stem member is shifted toward its said other position.

6. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, said body including first and second seating surfaces located respectively adjacent to the first and second chamber ends of said passage, first and second primary valve members extending in said first and second chambers respectively and having coaxial tubular stems extending in said passage coaxial with said orifice, said second primary valve stem extending in telescoping relation about said first primary valve stem and being longer than the distance between said seating surfaces, said first valve member in response to pressure thereacross being adapted to engage said first seating surface in sealing relationship to prevent communication between said first chamber and said passage and simultaneously to unseat said second primary valve member, pressure responsive means connected to said second primary valve member forming with said body a variable volume chamber communicating with said orifice, said second valve member in response to pressure thereacross being adapted to engage said second seating surface in sealing relationship to prevent communication between said passage and said second chamber and simultaneously to unseat said first valve member, an auxiliary stem member extending through said first and second primary valve members and stems and axially displaceable between two extreme positions, an auxiliary valve member on said stem member adapted in response to pressure thereacross when said member is in one position to engage said first valve member in sealing relationship to prevent communication between said first chamber and said orifice, said auxiliary stem member in said one of its positions having a portion thereof extending through said orifice adapted to be engaged by said independent control means for displacing said stem member toward the other of its positions and thereby unseat said auxiliary valve member, said orifice being adapted to be obstructed by said independent control means when said stem member is shifted toward its said other position, and means controlled by said first primary valve member for providing a restricted flow of fluid from said first chamber to said variable volume chamber when said orifice is obstructed and said first primary valve member is unseated.

7. A pilot valve for controlling the flow of a fluid from a pressure source to a motor element in response to variations in the flow of a relatively small volume of fluid from said source initiated by independent control means, comprising a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, said body including first and second seating surfaces located respectively adjacent to the first and second chamber ends of said passage, first and second primary valve members extending in said first and second chambers respectively and having open ended coaxial tubular stems extending in said passage coaxial with said orifice, said second primary valve stem extending in telescoping relation about said first primary valve stem and being longer than the distance between said seating surfaces, said first valve member in response to pressure thereacross being adapted to engage said first seating surface in sealing relationship to prevent communication between said first chamber and said passage and simultaneously to unseat said second primary valve member, pressure responsive means connected to said second primary valve member forming with said body a variable volume chamber communicating with said orifice, said second valve member in response to pressure thereacross being adapted to engage said second seating surface in sealing relationship to prevent communication between said passage and said second chamber and simultaneously to unseat said first valve member, said first primary valve member having an opening formed therethrough registering with its tubular stem, said second primary valve stem having an end presented toward said first primary valve member for engaging the same and having a notch formed in said end for providing a restricted flow of fluid from said first chamber to said variable volume chamber when said first primary valve member is unseated, an auxiliary stem member extending through said first and second primary valve members and stems and axially displaceable between two extreme positions, an auxiliary valve member on said stem member adapted in response to pressure thereacross when said member is in one position to engage said first valve member in sealing relationship and close said opening to prevent communication between said first chamber and said orifice, said auxiliary stem member in said one of its positions having a portion thereof extending through said orifice adapted to be engaged by said independent control means for displacing said stem member toward the other of its positions and thereby unseat said auxiliary valve member, and said orifice being adapted to be obstructed by said independent control means when said stem member is shifted toward its said other position.

8. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members extending in said first and second chambers respectively and having coaxial tubular stems extending in movable telescoping relation in said passage coaxial with said orifice, and at least one of said tubular stems being longer than said passage.

9. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members extending in said first and second chambers respectively and having coaxial tubular stems extending in said passage coaxial with said orifice, and said second valve stem extending in telescoping relation about said first valve stem and being longer than said passage.

10. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members extending in said first and second chambers respectively and having coaxial tubular stems extending in movable telescoping relation in said passage coaxial with said orifice, said body forming seating surfaces presented toward said valve members adjacent to the opposite ends of said passage, a pair of sealing members one loosely disposed adjacent to each of said seating surfaces, and said valve members each being adapted to engage one of said sealing members compress the same against the juxtaposed seating surface to thereby close the adjacent end of said passage.

11. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members loosely extending and axially movable in said first and second chambers respectively and having coaxial tubular stems extending in freely movable telescoping relation in said passage coaxial with said orifice, said body forming seating surfaces presented toward said valve members and extending transversely to the axis of and adjacent to the opposite ends of said passage, a pair of sealing members one loosely disposed between each of said valve members and the seating surface presented thereto, and said valve members each having a surface extending transverse to said axis for engaging the sealing member juxtaposed thereto and for forcing the same against its seating surface to close the adjacent end of said passage.

12. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members loosely extending and axially movable in said first and second chambers respectively and having coaxial tubular stems extending in freely movable telescoping relation in said passage coaxial with said orifice, said body forming seating surfaces presented toward said valve members and extending transversely to the axis of and adjacent to the opposite ends of said passage, a pair of sealing members one loosely disposed between each of said valve members and the seating surface presented thereto, said valve members each having a surface extending transverse to said axis for engaging the sealing member juxtaposed thereto and for forcing the same against its seating surface to close the adjacent end of said passage, and means for limiting displacement of said valve members toward said sealing members so as to limit compression of the latter.

13. In a pilot valve for controlling the flow of a fluid from a pressure source to a motor element in response to variations in the flow of a relatively small volume of fluid from said source initiated by independent control means, a body having an orifice formed therein, a first chamber communicating with an inlet adapted to be coupled to said source, a second chamber communicating with the atmosphere and a passage coaxial with said orifice extending between said first and second chambers and communicating intermediate the ends thereof with an outlet adapted to be coupled to said motor element, valve means forming with said body a variable volume chamber communicating with said orifice, said valve means including first and second valve members loosely extending and axially movable in said first and second chambers respectively and having coaxial tubular stems extending in freely movable telescoping relation in said passage coaxial with said orifice, said body forming seating surfaces presented toward said valve members and extending transversely to the axis of and adjacent to the opposite ends of said passage, a pair of O-rings loosely disposed between each of said valve members and the seating surface presented thereto, said valve members each having a surface extending transverse to said axis for engaging the O-ring juxtaposed thereto and forcing the same against its seating surface to close the adjacent end of said passage, and said body having shoulders extending between said seating surfaces and said valve members adapted to arrest movement of said valve members toward said O-rings and thereby limit compression of the latter.

References Cited in the file of this patent

UNITED STATES PATENTS

| | | |
|---|---|---|
| 2,803,258 | Dyson | Aug. 20, 1957 |
| 2,831,465 | Perry | Apr. 22, 1958 |
| 2,836,153 | Dyson | May 27, 1958 |
| 2,907,347 | Parks | Oct. 6, 1959 |